(12) United States Patent
Hwang et al.

(10) Patent No.: US 12,033,765 B2
(45) Date of Patent: Jul. 9, 2024

(54) SAFETY COVER STRUCTURE USABLE IN DISMANTLING OPERATIONS AT NUCLEAR FACILITY

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 417 days.

(21) Appl. No.: 17/438,960

(22) PCT Filed: Mar. 13, 2020

(86) PCT No.: PCT/KR2020/003531
§ 371 (c)(1),
(2) Date: Sep. 14, 2021

(87) PCT Pub. No.: WO2020/185033
PCT Pub. Date: Sep. 17, 2020

(65) Prior Publication Data
US 2022/0148749 A1    May 12, 2022

(30) Foreign Application Priority Data

Mar. 14, 2019    (KR) ........................ 10-2019-0029433

(51) Int. Cl.
*G21D 1/00*    (2006.01)
*G08B 21/18*    (2006.01)
*G21C 9/04*    (2006.01)
(52) U.S. Cl.
CPC ........... *G21D 1/003* (2013.01); *G08B 21/182* (2013.01); *G21C 9/04* (2013.01)

(58) Field of Classification Search
CPC ........ G21D 1/003; G21C 9/04; G08B 21/182; G08B 21/12; G21F 3/00
(Continued)

(56) References Cited

U.S. PATENT DOCUMENTS

2002/0186806 A1    12/2002    Aoki et al.
2018/0261068 A1*    9/2018    Loewen ............... H05B 47/185

FOREIGN PATENT DOCUMENTS

CN    201319267    9/2009
DE    4428501    2/1996
(Continued)

OTHER PUBLICATIONS

Slater Steve: "Remote handling techniques in decommissioning", Sep. 20, 2011 (Sep. 20, 2011), XP055832802, Retrieved from the Internet: URL:https://www.oecd-nea.org/upload/docs/application/pdf/2021-02/rwmr2011-2.pdf [retrieved on Aug. 18, 2021].
(Continued)

*Primary Examiner* — Jack W Keith
*Assistant Examiner* — Daniel Wasil
(74) *Attorney, Agent, or Firm* — LEX IP MEISTER, PLLC

(57) ABSTRACT

A safety cover structure of a nuclear facility is disclosed. The safety cover structure includes: a cover portion rotatably installed on a body protection concrete slab to cover a cavity where a reactor pressure container is located; a driving portion configured to rotate the cover portion relative to the cavity; an opening and closing portion that is installed on the cover portion and is configured to allow materials resulting from cutting and dismantling of the reactor pressure container to move therethrough; a fire extinguishing portion configured to extinguish a fire generated inside the cover portion; a dose sensor installed in the cover portion and configured to measure a radiation dose emitted from the
(Continued)

reactor pressure container; and an alarm portion configured to receive a sensing signal from the dose sensor and provide an alarm when the measured radiation dose exceeds a predetermined value.

8 Claims, 7 Drawing Sheets

(58) Field of Classification Search
USPC .................. 376/293, 287, 205, 206, 460
See application file for complete search history.

(56) References Cited

FOREIGN PATENT DOCUMENTS

| | | | | |
|---|---|---|---|---|
| DE | 4428501 A1 | * | 2/1996 | ............ G21C 13/02 |
| JP | 60-065700 | | 5/1985 | |
| JP | H01295197 | | 11/1989 | |
| JP | H06-12997 | | 2/1994 | |
| JP | 2001238970 | * | 2/2000 | ............ A26C 3/00 |
| JP | 2001-333994 | | 12/2001 | |
| JP | 2007-046982 | | 2/2007 | |
| JP | 2012-093181 | | 5/2012 | |
| JP | 2012-173111 | | 9/2012 | |
| KR | 0201118 | | 11/2000 | |
| KR | 20130129759 | * | 5/2012 | ............ E04B 9/02 |
| KR | 101353690 | * | 12/2012 | ............ E04B 1/32 |
| KR | 10-1306871 | | 9/2013 | |
| KR | 2015-0075822 | | 7/2015 | |
| KR | 10-1661887 | | 10/2016 | |

OTHER PUBLICATIONS

EPO, European Opinion of EP 20768995.1 dated Oct. 31, 2022.

* cited by examiner

SAFETY COVER STRUCTURE USABLE IN DISMANTLING OPERATIONS AT NUCLEAR FACILITY

TECHNICAL FIELD

The present invention relates to a safety cover structure of a nuclear power facility for safely dismantling the nuclear power facility.

BACKGROUND ART

In general, a pressurized light-water reactor type of nuclear power plant among nuclear power facilities used for nuclear power generation includes a reactor pressure container and a body protection concrete slab surrounding the reactor pressure container.

When dismantling the nuclear power facility, it is necessary to separate the reactor pressure container from the body protection concrete slab and cut and dismantle the reactor pressure container.

However, in the process of cutting and dismantling the reactor pressure container, harmful materials such as aerosols and scattering materials are generated, thereby causing environmental pollution.

In addition, when a radiation dose is excessively generated from the reactor pressure container, there is a problem in that a worker does not recognize the excessive emission of radiation, thereby causing excessive radiation exposure.

DISCLOSURE

Technical Problem

An embodiment of the present invention is to provide a safety cover structure of a nuclear power facility for preventing discharge of environmentally harmful materials and preventing excessive radiation exposure.

Technical Solution

A safety cover structure of a nuclear power facility according to an embodiment of the present invention includes: a cover portion that is rotatably installed in body protection concrete to cover a cavity where a reactor pressure container is located; a driving portion that provides a rotation driving force to the cover portion; an opening and closing portion that is installed in the cover portion and through which materials from cutting and dismantling of the reactor pressure container move; a fire extinguishing portion that extinguishes a fire generated inside the cover portion; a dose sensor that is installed in the cover portion and measures a radiation dose; and an alarm portion that receives a sensing signal from the dose sensor and alarms when radiation exceeding a predetermined value is emitted from the reactor pressure container.

The opening and closing portion may be a sliding gate that is slidably installed on the cover portion.

The driving portion may include a first gear installed in the cavity, and a driving motor that is installed in the cover portion, and where a second gear meshed with the first gear is rotatably installed.

The fire extinguishing portion may include: a fire detector that senses whether or not a fire has occurred inside the cavity; and a fire extinguishing device that receives a sensing signal of the fire detector and suppresses a fire when the fire occurs.

The alarm portion may be a warning speaker that audibly warns a worker when radiation exceeding a predetermined value is emitted from the reactor pressure container.

The safety cover structure of the nuclear power facility may further include a sealing portion that is installed between the cover portion and the body protection concrete slab.

The sealing portion is a flexible film installed between the cover portion and the body protection concrete slab.

A gate blower that blows pressurized air may be installed in the sliding gate.

A cover blower that blows pressurize air to a direction of the body protection concrete slab may be installed on an edge circumference of the cover portion.

Advantageous Effects

According to the embodiment of the present invention, the reactor pressure container closes and seals the upper side of the installation position with the cover portion, and performs cutting and dismantling of the reactor pressure container, and thus environmentally harmful materials such as air aerosols and scattering products can be prevented from being discharged to the outside.

According to the embodiment of the present invention, it is possible to determine in real time whether a fire occurs in the reactor pressure container position, and to enable initial extinguishing of the fire, thereby achieving effective fire extinguishing.

According to the embodiment of the present invention, by measuring the amount of radiation generated in the process of cutting and dismantling the reactor pressure container in real time, it is possible to warn the worker when radiation exceeding the predetermined value is emitted, thereby preventing excessive radiation exposure from being occurred.

MODE FOR INVENTION

Figure 1:
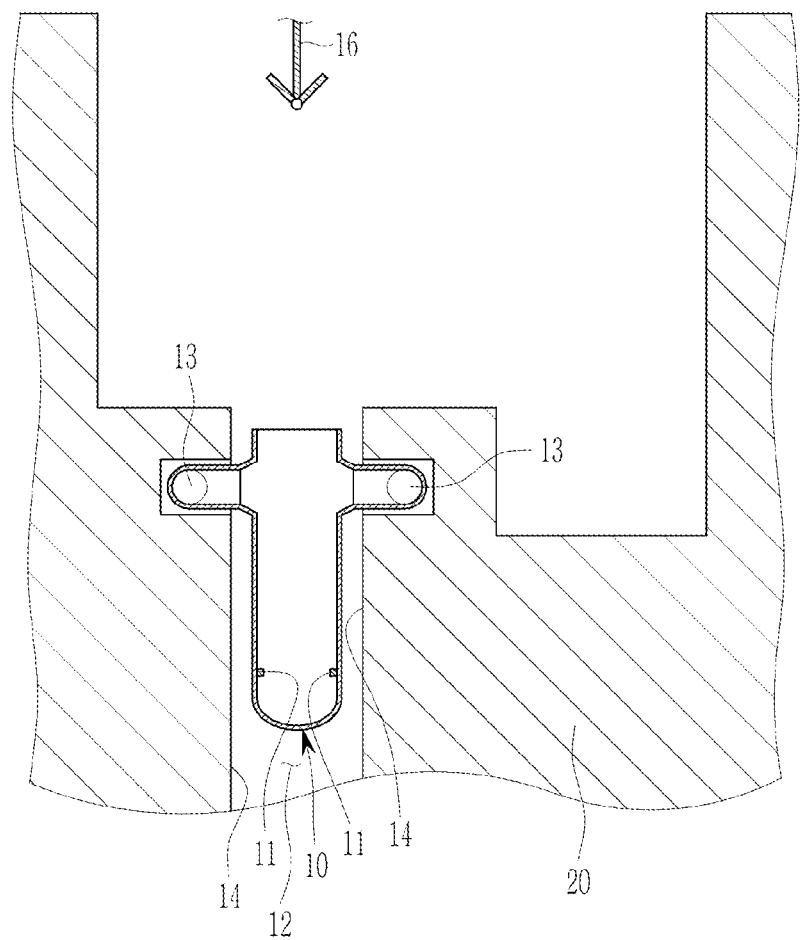
FIG. 1 schematically illustrating a part of a nuclear power facility according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

The safety cover structure 100 of the nuclear facility described below is installed to cover the upper side of the installation location of the reactor pressure container 10 to prevent fire, radiation exposure, or contamination of a working environment during cutting and dismantling of the reactor pressure container 10.

This will be described in detail with reference to the accompanying drawing.

Figure 2:
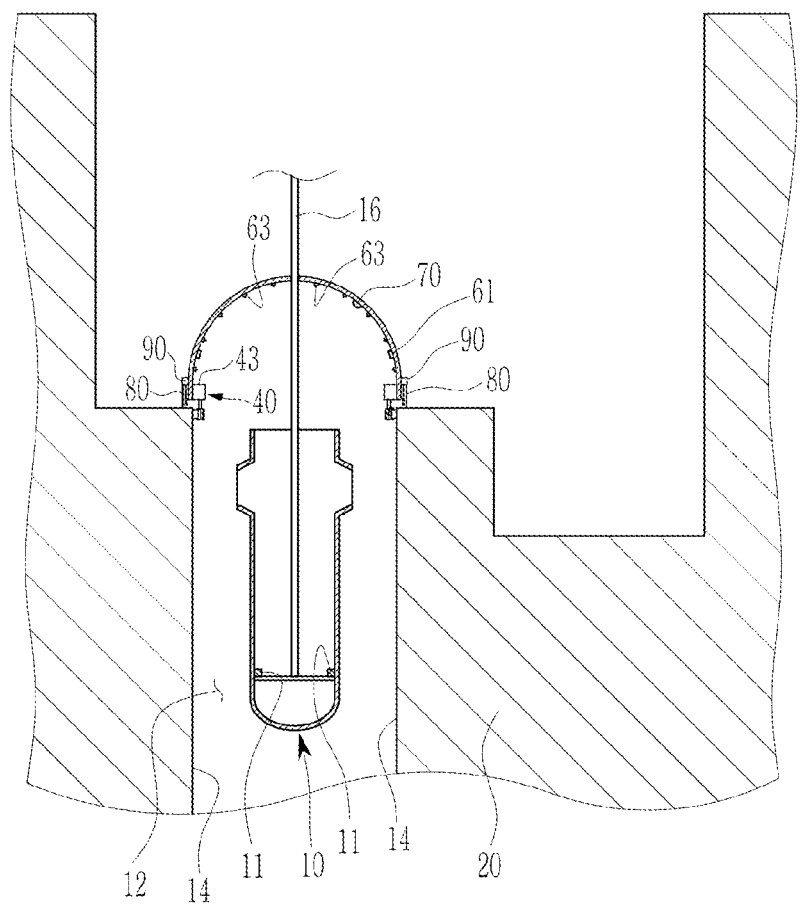
FIG. 2 schematically illustrates a state in which an inner wall of the body protection concrete is expanded in the nuclear power facility of FIG. 1, pipes are separated from a reactor pressure container, and a cover portion is installed in a cavity.

FIG. 1 schematically illustrates a main part of a nuclear power facility according to an embodiment of the present invention, and FIG. 2 is a main part drawing that schematically illustrates a state in which an inner wall of the body protection concrete is expanded in the nuclear power facility of FIG. 1, pipes are separated from a reactor pressure container, and a cover portion is installed in a cavity.

As shown in FIG. 1 and FIG. 2, a safety cover structure 100 of a nuclear power facility according to an embodiment of the present invention includes a cover portion 30 that is rotatably installed in a body protection concrete slab 20 to cover a cavity 12 where a reactor pressure container is located in the body protection concrete slab 20, a driving portion 40 that provides rotation driving force to the cover portion 30, an opening and closing portion 4 installed in the cover portion 30 for movement of materials generated from cutting and dismantling of the reactor pressure container 10, a fire extinguishing portion 60 that extinguishes a fire generated inside the cavity 12, and an alarm portion 71 that alarms when radiation exceeding a set value is emitted from the reactor pressure container 10.

The reactor pressure container 10 may be a pressurized light water reactor type, but is not limited thereto. For example, the reactor pressure container 10 may be a boiling light water reactor type. A protrude portion 11 supporting a core of various known types is protruded on the inner wall of the reactor pressure container 10.

A plurality of pipes 13 are connected to various types of known steam generators. Among the pipes 13, hot water may pass through one pipe, and cold water may pass through the other pipe, but is not limited thereto.

The body protection concrete slab 20 may include the cavity 12 where the reactor pressure container 10 is located, and an inner wall 14 that opposes the reactor pressure container 10 by forming the cavity 12.

A crane 16 may be disposed on the body protection concrete slab 20.

The crane 16 may be a crane used during the installation of the nuclear power facility, but is not limited to.

Before expanding the inner wall 14 for installation of the cover portion 30 to carry out cutting and release of the reactor pressure container 10, the body protection concrete slab 20 may remove an insulation that surrounds the reactor pressure container 10.

Next, as shown in FIG. 2, the inner wall of the cavity 12 is cut and expanded, and the cover portion 30 is installed to cover the cavity 12.

The cover portion 30 may be installed to cover the upper side of the cavity 12 where the reactor pressure container 10 is installed. The cover portion 30 may be installed rotatably from the upper side of the reactor pressure container 10 with the cavity 12 closed and sealed.

As described, the cover portion 30 is installed in order to block the discharge of environmentally harmful materials such as aerosols and fumes generated in the process of cutting and dismantling the reactor pressure container 10 inside the cavity 12 to the outside. The cover portion 30 may be rotatably installed in one direction or in a reverse direction by the driving portion 40 installed between the inner wall surface of the cavity 12 and the cover portion 30.

Figure 3:
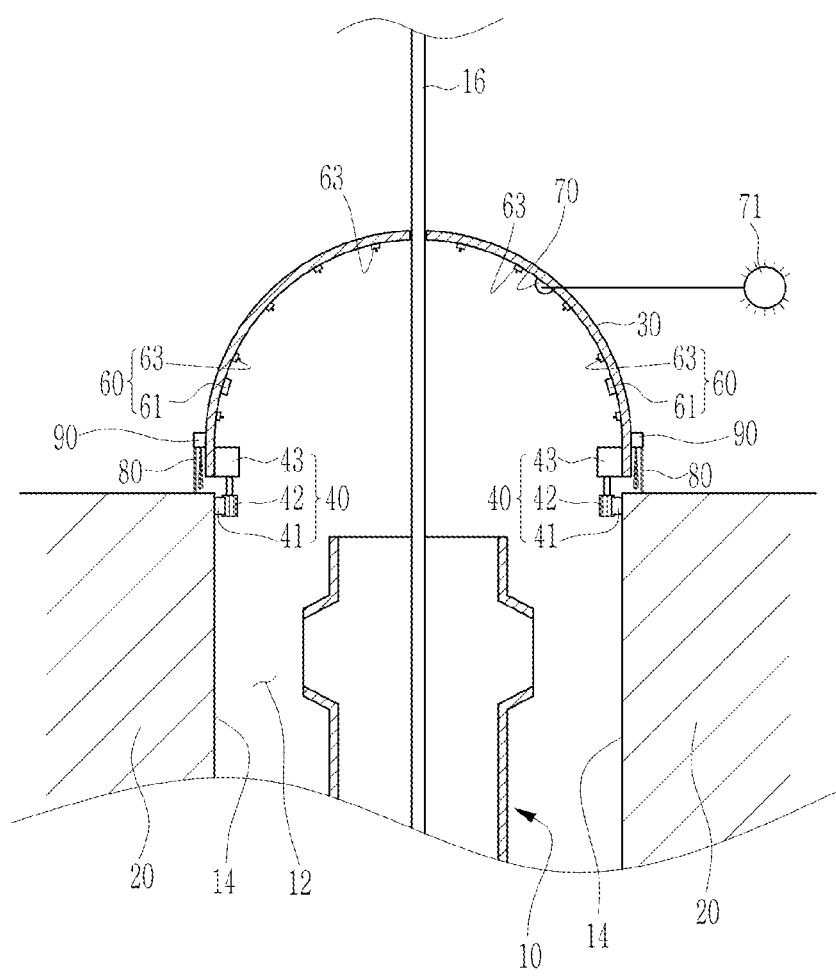
FIG. 3 schematically illustrates a state in which the cover portion of FIG. 2 is rotatably installed by a driving portion.
Figure 4:
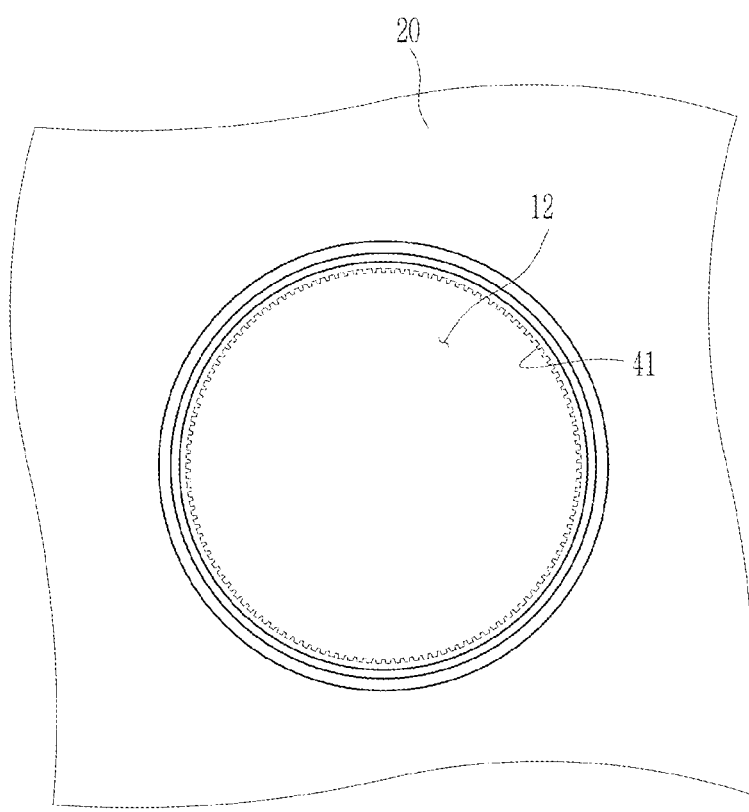
FIG. 4 schematically illustrates a state a first gear is installed in the cavity of FIG. 2.

FIG. 3 schematically illustrates a state in which the cover portion of FIG. 2 is rotatably installed by a driving portion, and FIG. 4 schematically illustrates a state a first gear is installed in the cavity of FIG. 2.

As shown in FIG. 3 and FIG. 4, the driving portion 40 may include a first gear 41 that is installed along an upper circumference on the inner wall of the cavity 12, and a driving motor 43 installed in the cover 30 and in which a second gear 42 meshed with the first gear 41 is rotatably installed.

The first gear 41 is installed in a round shape along the upper circumference of the cavity 12, and may be meshed with the second gear 42.

The drive motor 43 is installed on the cover portion 30, and the second gear 42 may be rotatably installed on the drive shaft.

The driving motor 43 may also be installed as one on the side of the cover portion 30, and may also be installed as plural radially along the circumference of the cover portion 30.

Here, since the second gear 42 is meshed with the first gear 41, the cover portion 30 may selectively rotate in one direction or the reverse direction according to driving operation of the driving motor 43.

As described, the rotation operation of the cover portion 30 is to facilitate the extinguishing operation of the fire extinguishing portion 60 installed inside the cover portion 30 when a fire occurs inside the cover portion 30.

In addition, according to the rotation operation of the cover portion 30, it is possible to stably move the cutting and dismantling of the reactor pressure container 10 to the outside. That is, it is possible to vary the position of the opening and closing portion 4 according to the rotation operation of the cover portion 30, and also possible to easily move materials from the cutting and dismantling generated inside the cavity 12 to a predetermined position.

This will be described in detail hereinafter.

The opening and closing portion 4 may be installed in the cover portion 30.

Figure 5:
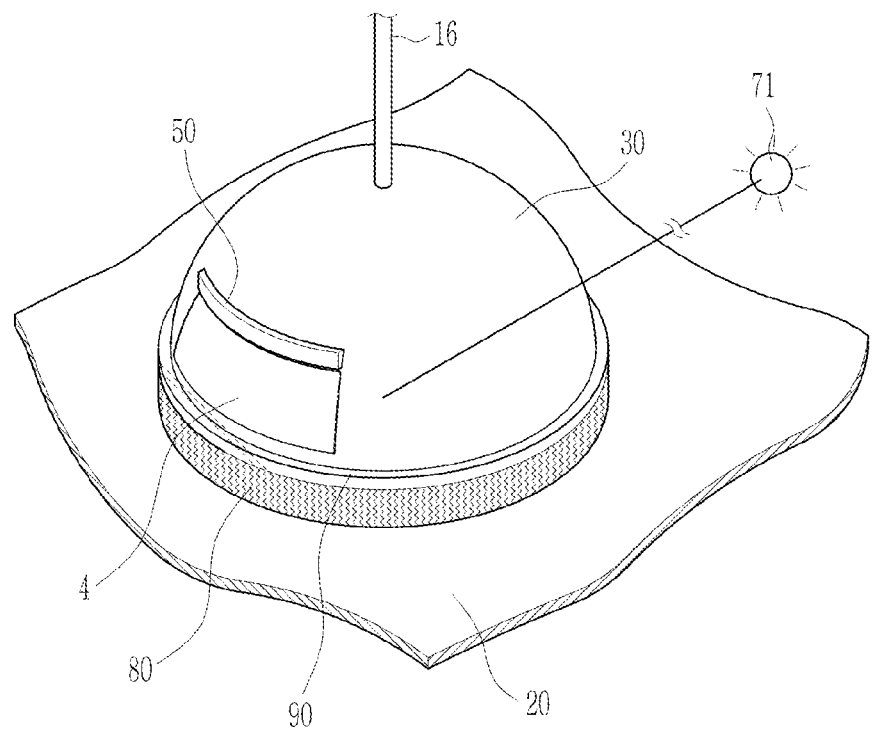
FIG. 5 is a perspective view that schematically illustrates a state in which an opening and closing portion is installed in the cover portion according to the embodiment of the present invention.

FIG. 5 is a perspective view schematically illustrating a state in which the opening and closing portion is installed on the cover portion according to the embodiment of the present invention.

As shown in FIG. 5, as being installed so as to be opened and closed on the cover portion 30, the opening and closing portion 4 is exemplarily applied as a sliding gate that is slidably installed on the cover portion 30 in the present embodiment. The opening and closing portion 4 is not necessarily limited to a sliding type, and it is also possible to appropriately change to a rotatable opening and closing type.

As such, the opening and closing portion 4 is slidably installed on the cover portion 30, so that the cutting and dismantling material generated during the cutting and dismantling operation of the reactor pressure container 10 inside the cover portion 30 can be easily moved and discharged to the outside by the opening operation of the opening and closing portion 4.

A gate blower 50 may be installed in the opening and closing portion 4.

The gate blower 50 is installed in the opening and closing portion 4, and may blow pressurized air in the open state of the opening and closing portion 4 to prevent environmentally harmful materials such as aerosols and scattering products generated in the process of cutting and dismantling the reactor pressure container 10 generated inside the cover portion 30 from being discharged to the outside.

Meanwhile, a fire extinguishing portion 60 for suppressing fire may be installed inside the cover portion 30.

Figure 6:
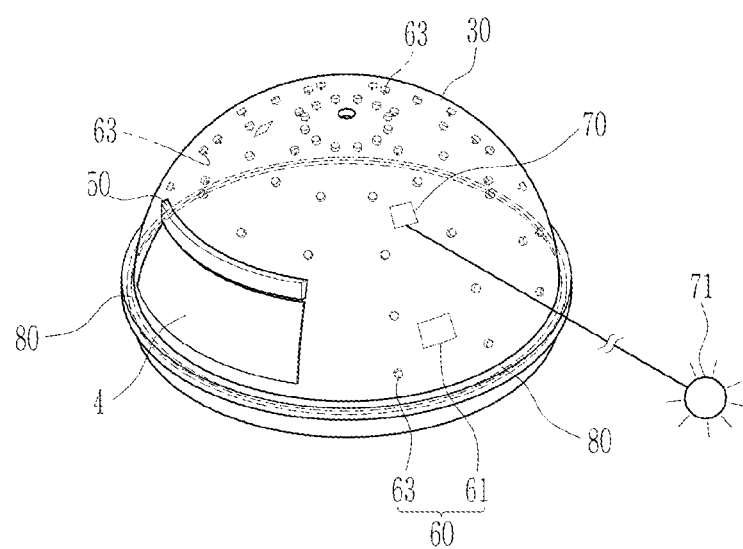
FIG. 6 is a perspective view that schematically illustrates a state in which a fire extinguishing portion, a radiation sensor, and an alarm portion in the cover portion according to the embodiment of the present invention.
Figure 7:
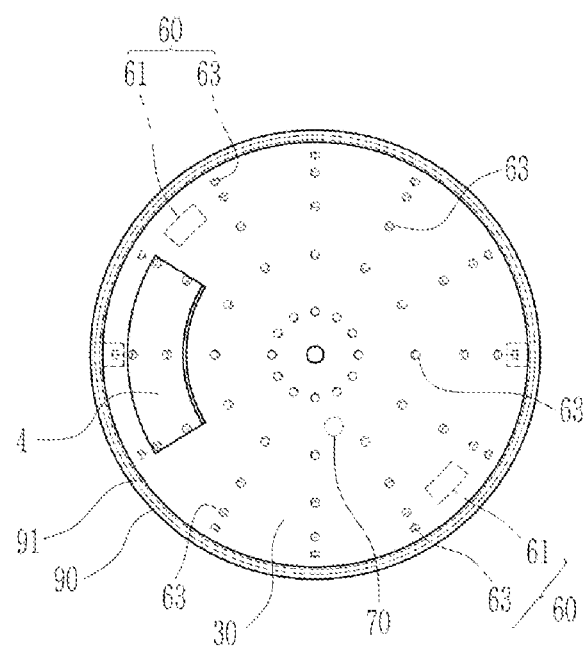
FIG. 7 is a bottom view that schematically illustrates a state in which a fire extinguishing portion, a radiation sensor, and an alarm portion in the cover portion of FIG. 6.

FIG. 6 is a perspective view that schematically illustrates a state in which a fire extinguishing portion, a radiation sensor, and an alarm portion in the cover portion according to the embodiment of the present invention, and FIG. 7 is a bottom view that schematically illustrates a state in which a fire extinguishing portion, a radiation sensor, and an alarm portion in the cover portion of FIG. 6

As shown in FIG. 6 and FIG. 7, the fire extinguishing portion 60 may include a fire detector 61 that senses whether or not a fire has occurred inside the cavity 12, and a fire extinguishing device 63 that receives a sensing signal of the fire detector 61 and suppresses a fire when the fire occurs.

The fire detector 61 is installed on the inner wall of the cavity 12, and may be installed to sense whether a fire has occurred at the position of the cavity 12 where the reactor pressure container 10 is installed.

That is, the fire detector 61 may be installed inside the cavity 12 to detect a change in gas such as smoke due to a fire. Although it is exemplarily described that the fire detector 61 is installed as one inside the cover portion 30, the present invention is not necessarily limited thereto, and a plurality of the fire detectors 61 may be radially installed on the inner wall surface of the cover portion 30.

The fire detector 61 may detect whether a fire has occurred inside the cover portion 30, and may transmit a sensing signal to the fire extinguishing device 63.

The fire extinguishing device 63 may receive the sensing signal of the fire detector 61 and be installed in the cover portion 30 to be operated in a state of fire.

It is exemplarily described that the fire extinguishing device 63 is operated according to the sensing signal of the fire detector 61 inside the cover portion 30 and is installed as a spring cooler that sprays fire extinguishing water to the fire generating position. However, the fire extinguishing device 63 is not necessarily limited to a spring cooler, and it is also possible to appropriately change and apply an extinguishing liquid injector that injects the extinguishing liquid to the fire generating position.

Therefore, the fire extinguishing device 63 is operated according to the fire sensing signal of the fire detector 61, and it is possible to quickly spray fire extinguishing water to the fire generating position, thereby enabling smooth initial extinguishing of the fire.

Meanwhile, a dose sensor 70 for measuring a radiation dose may be installed in the cover portion 30.

The dose sensor 70 is installed inside the cover portion 30, and may measure the amount of radiation emitted from the reactor pressure container 10. The dose sensor 70 may be installed as one or plural in a state of being spaced apart from each other inside the cover portion 30.

As described, a sensing signal measured by the dose sensor 70 may be transmitted to the alarm portion 71.

The alarm portion 71 may be installed to receive a radiation dose measurement signal transmitted from the dose sensor 70, and when it is determined that radiation exceeding a predetermined value is discharged from the reactor pressure container 10, it may alert a worker in real time.

When the radiation dose exceeds the predetermined value in the present embodiment, the alarm portion 71 may be applied as a warning speaker to audibly warn the worker However, the alarm portion 71 is not necessarily limited to being applied as a warning speaker, and it is also possible to be applied as a display that visually warns the worker.

As described, since the alarm portion 71 is installed inside the cover portion 30, when the radiation dose exceeds the determined value in the process of cutting and dismantling reactor pressure container 10, the alarm portion 71 properly alerts the worker, thereby preventing excessive radiation exposure and thus preventing the worker from getting an exposure disease.

Meanwhile, a sealing portion 80 may be installed on the edge of the cover portion 30.

The sealing portion 80 is installed along an edge circumference of the cover portion 30, and prevent environmental harmful materials such as aerosols and scattering products generated during the cutting and dismantling of the reactor pressure container 10 inside the cover portion 30 from being discharged to the outside of the cover portion 30.

The sealing portion 80 is connected to along the edge circumference of the cover portion 30, and may be extended in a direction of body protection concrete 20.

Such a sealing portion 80 can be applied as a flexible film with a variable shape. Therefore, the sealing portion 80 is capable of stably sealing between the edge of the cover portion 30 and the body protection concrete slab 20 in a state of having a variable length even during the rotation operation of the cover portion 30, and can prevent external environmental pollution from occurring at the outside of the cover portion 30.

One side of the sealing portion 80 in the length direction is connected to cover portion 30 along the lower edge circumference of the cover portion 30, and the other side may be extended to contact the body protection concrete slab 20. The sealing portion 80 is also possible to be installed slidably rotatably according to rotation of the cover portion 30 in a state that the extended edge is drawn to a certain depth inside the body protection concrete slab 20.

Meanwhile a cover blower 90 may be installed on the circumference of the cover portion 30.

The cover blower 90 is installed on the edge circumference of the cover portion 30 and may blow pressurized air in the direction of the body protection concrete slab 20.

That is, the cover blower 90 is installed along the circumference of the cover portion 30 to blow pressurized air to form an air curtain with the pressurized air between the cover portion 30 and the body protection concrete slab 20.

Therefore, the cover blower 90 can block the discharge of environmentally harmful materials such as aerosols and scattering products generated in the process of cutting and dismantling the reactor pressure container 10 from the inside of the cover portion 30 to the outside.

The cover blower 90 is installed so that pressurized air is sprayed along the circumference of the outer surface of the cover portion 30, and can receive air supply through a blower (not shown) and blow it.

The cover blower 90 is installed in a round shape along the circumference of the cover portion 30, an air flow path through which the pressurized air moves is formed, and an air nozzle 91 through which the pressurized air is injected may be formed on the bottom surface thereof.

The air nozzle 91 may be formed to have a long length along the bottom surface of the rounded cover blower 90, and thus pressurized air is blown along the bottom surface of the cover blower 90 as an air curtain type.

Therefore, the cover blower 90 can reliably seal between the cover portion 30 and the body protection concrete slab 20 together with the sealing portion 80, thereby effectively preventing the occurrence of environmental pollution.

As described above, in the safety cover structure 100 of the nuclear power facility of the present embodiment, it is possible to perform cutting and dismantling of the reactor pressure container 10 in a state where the upper side of the position where the reactor pressure container 10 is installed is closed and sealed with the cover portion 30, and thus discharge of the environmentally harmful materials such as aerosols and scattering products to the outside can be prevented.

In addition, it is possible to check whether a fire has occurred in real time to enable initial extinguishing of the fire by installing a fire extinguishing portion inside the cover portion 30, thereby achieving effective fire extinguishing.

In addition, it is possible to quickly warn the worker through the alarm portion 71 when the radiation exceeding the set value is discharged by measuring the amount of radiation generated inside the cover portion 30 in real time.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A safety cover structure of a nuclear power facility, comprising:
    a cover portion that is rotatably installed on a body protection concrete slab to cover a cavity where a reactor pressure container is located;
    a driving portion configured to horizontally rotate the cover portion around the cavity;
    an opening and closing portion that is installed on the cover portion and is configured to allow materials resulting from cutting and dismantling of the reactor pressure container to move therethrough;
    a fire extinguishing portion configured to extinguish a fire generated inside the cover portion;
    a dose sensor that is installed in the cover portion and is configured to measure a radiation dose emitted from the reactor pressure container; and
    an alarm portion configured to receive a sensing signal from the dose sensor and provide an alarm when the dose sensor measures a radiation dose exceeding a predetermined value,
    wherein
    the driving portion comprises
    a first gear installed on the body protection concrete slab around an inner wall of the cavity;
    a driving motor installed in the cover portion and provided with a rotation axis; and
    a second gear meshed with the first gear and connected to the rotation axis.

2. The safety cover structure of the nuclear power facility of claim 1, wherein
    the opening and closing portion is a sliding gate that is slidably installed on the cover portion.

3. The safety cover structure of the nuclear power facility of claim 2, wherein
    a gate blower that blows pressurized air is installed in the sliding gate.

4. The safety cover structure of the nuclear power facility of claim 1, wherein
    the fire extinguishing portion comprises:
    a fire detector that is configured to sense whether or not a fire has occurred inside the cavity; and
    a fire extinguishing device that is configured to receive a sensing signal of the fire detector and suppress a fire when the fire occurs.

5. The safety cover structure of the nuclear power facility of claim 1, wherein
    the alarm portion is a warning speaker that is configured to audibly warn a worker when a radiation dose exceeding the predetermined value is measured.

6. The safety cover structure of the nuclear power facility of claim 1, further comprising a sealing portion that is installed between the cover portion and the body protection concrete slab.

7. The safety cover structure of the nuclear power facility of claim 6, wherein
    the sealing portion is a flexible member installed between the cover portion and the body protection concrete slab.

8. The safety cover structure of the nuclear power facility of claim 1, wherein
    a cover blower that is configured to blow pressurized air toward the body protection concrete slab is installed on an edge circumference of the cover portion.

* * * * *